July 30, 1957 A. V. OSBORNE 2,801,024
CORROSION RESISTANT TANK
Filed June 22, 1954
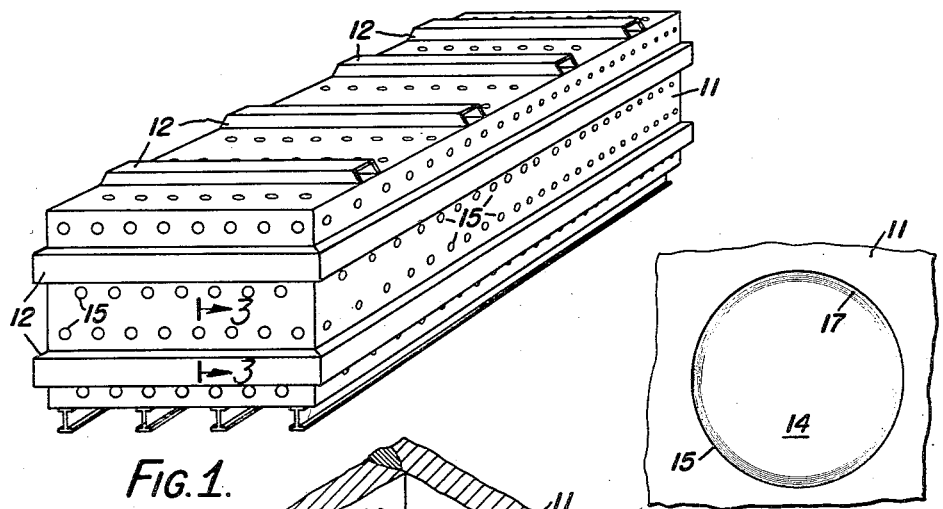
FIG. 1.
FIG. 4.
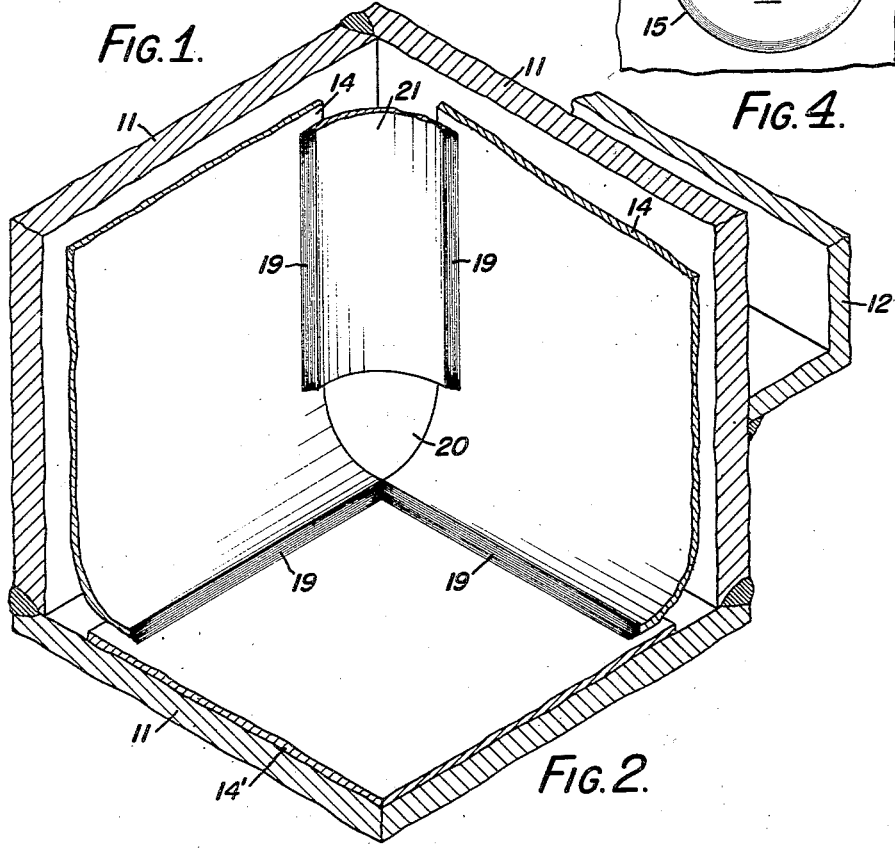
FIG. 2.
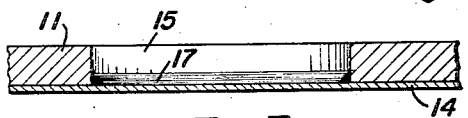
FIG. 3.
INVENTOR.
ALEC V. OSBORNE
BY
HIS ATTORNEY

United States Patent Office 2,801,024
Patented July 30, 1957

2,801,024

CORROSION RESISTANT TANK

Alec V. Osborne, Brighton, N. Y., assignor to The Pfaudler Co., Rochester, N. Y., a corporation of New York Application June 22, 1954, Serial No. 438,507

5 Claims. (Cl. 220—63)

This invention relates to containers or tanks, having corrosion resistant linings and, more particularly, to tanks lined or clad with thin sheets of corrosion resisting alloys or other special materials, one object of this invention being the provision of an improved tank of this description capable of being more readily and economically manufactured.

In many industrial applications, it is desirable to have storage tanks and other containers manufactured of corrosion resisting materials to resist chemical attack, as well as to facilitate cleaning, and thus to protect the contents against contamination. However, as is well known, the corrosion resisting materials such as metal alloys, and particularly the stainless steels, for example, are expensive, and therefore the cost of large vessels made of these materials is an important manufacturing consideration. It is, therefore, desirable to manufacture the supporting or outer shell portions of such vessels out of some suitable strong but relatively inexpensive structural material such as mild steel, and to line the interior thereof with thin sheets of the desired corrosion resisting material. Another object of this invention, therefore, is to provide a practical tank of this description that may be readily and economically produced.

Another object of this invention is the provision of an alloy clad tank of the above description that may be produced without resort to the rolling and forging methods heretofore in use for producing alloy clad steel.

Another object is the provision of a method of lining tanks with corrosion resisting material wherein said lining may be installed after the completion of the outer base metal shell.

In the manufacture of tanks, particularly for the food, beverage, drug and chemical industries, it is advantageous to provide a tank capable of being easily and effectively cleaned and so maintained in a sanitary condition and free from contamination of the contents. To this end, it has been a practice in the industry to avoid sharp corners and crevices wherein dirt and foreign matter may accumulate, and which are difficult to clean. Accordingly, tanks have been supplied for these purposes in which the supporting or outer shell walls have been constructed with rounded interior angles and corners, so as to eliminate crevices where bacteria and other contaminating matter may accumulate. It, therefore, is a still further object of this invention to provide tanks lined with sheets of corrosion resisting materials in which such sheets are made with rounded intersections and corners, so as to avoid the expense of a specially designed outer shell.

To these and other ends the invention resides in certain improvements and combinations of parts, all as will be hereinafter more fully described, the novel features being pointed out in the claims at the end of the specification.

In the drawings:

Fig. 1 is a perspective external view of a tank embodying the present invention;

Fig. 2 is an enlarged perspective view partly in section and partly broken away and showing a portion of the interior of the tank of Fig. 1;

Fig. 3 is an enlarged fragmentary sectional view taken substantially along line 3—3 in Fig. 1, and Fig. 4 is an enlarged fragmentary elevational view showing a welding feature.

A tank embodying this invention and herein described by way of illustration, comprises an outer steel shell 11, preferably of welded construction, made of sufficiently heavy material to withstand any mechanical stresses to which the tank may be subjected. Shell 11 may be of any desired size and shape, but for purposes of illustration, a rectangular tank, such as those used in breweries for carrying out fermentations, will be described. In this case, shell 11 is preferably stiffened and braced against internal pressure by a series of channel shaped braces 12, welded to the outer surface thereof, as shown in Fig. 1. The lining of this tank comprises a plurality of thin sheets 14, preferably of stainless steel, or other suitable alloy, which are laid on the interior surfaces of the outer steel shell, as shown in Fig. 2, and fastened in place in a manner hereinafter described. While lining sheets of alloy material are herein referred to by way of illustration, it is contemplated that such sheets may be made of plastic or other known and suitable materials with cement or other suitable fastening means.

Outer shell 11 is pierced by a plurality of welding holes 15 as shown in Figs. 1 and 3, preferably of larger diameter than those heretofore used for "plug" welds and they may have a diameter of say three (3) inches. A circular fillet weld 17, Fig. 3, is then run around the junction between the bottom of the wall of each hole 15 and the back of the adjacent stainless steel sheets 14. Such welds 17 securely bind the stainless steel lining to outer shell 11 around the periphery of the bottom of holes 15. Since this periphery is of substantial length, the length of the fillet weld 17 is sufficient to form a very strong bond between stainless steel sheet 14 and outer shell 11. While the diameter of holes 15 is large enough to permit access for welding, it is small enough so that the unsupported surface of the stainless steel lining is small relative to the thickness thereof, and so that there is no tendency for the lining to be deformed by interior pressure at these points.

Stainless steel sheets 14 and 14' are applied to the interior of the tank 11 and are welded into place as described above. After the first sheet 14' has been applied, additional sheets are applied overlapping the original sheet as shown in Fig. 2. The joints between adjacent sheets are then lap welded, as shown in 19 (Fig. 2), with a fillet weld at the exposed edge, to present an unbroken surface of stainless steel to the contents of the tank.

The relatively thin nature of welds 17 as compared to the solid plug welds heretofore commonly used for this purpose, results in less heat being applied to the stainless lining. This results in less distortion of the stainless steel sheet which reduces the warpage and buckling effects, thereby producing a smoother, more uniform and satisfactory interior surface in the tank. Further, this less severe application of heat minimizes the effects of the welding process on the physical and chemical properties of the stainless steel linings, which may be adversely affected by the prolonged application of high temperatures.

The process of lap welding the stainless steel sheets comprising the tank lining has the advantage of providing a double thickness of stainless steel at the joints. A further advantage of this method is economy in production, as it allows greater tolerance in the initial cutting and fitting of the stainless steel sheets. In the butt welding process heretofore in use, the sheets had to be cut and fitted very accurately in order to butt against one another with sufficient precision to allow a satisfactory job of welding to be performed. In the lap welding method herein disclosed, no such accurate cutting and fitting is required, since the exact degree of overlap of stainless steel plates comprising the tank lining is not critical.

Tanks manufactured for use in the food, beverage, drug and chemical industries must be so manufactured as to be easily cleaned. Accordingly, it is the practice in these industries to use tanks whose interior surfaces are smooth and whose corners are rounded to prevent the formation of inaccessible places for the collection of contaminating materials. In the construction of tanks of this description, the manufacture of rounded edges and corners of heavy metal plates is a difficult and costly procedure. In tanks made according to the invention, the outer shell 11 of square or rectangular tanks manufactured according to this invention is not rounded but may be built up of flat plates welded together and left square as shown in Figs. 1 and 2, as the sanitary requirements are fulfilled by the method of applying the lining as herein described. This results in a considerable savings in the cost of fabricating tanks.

Where it is necessary to comply with the requirements of sanitary design, the stainless steel linings are curved at the edges and the trihedral corners as shown in Fig. 2. This presents a smooth and rounded surface on the interior of the tank so that the latter may be easily cleaned as described above, but adds very little to the cost of fabricating of the same, as the relatively thin stainless steel sheets comprising the lining are easily bent and formed for this purpose.

The construction disclosed above results in small unsupported areas in the edges and corners of the tank, as shown in Fig. 2, where the curved corners of the sheets of lining metal are out of contact with the supporting base metal of the outer shell. However, as these areas are relatively small and of strongly curved shape, they do not cause any structural weakness in the finished tank and tanks so constructed are adapted to withstand an internal pressure of at least twice that of the external atmosphere.

Tanks manufactured as described above are preferably provided with curved corner construction comprising two specially shaped sections 20 and 21 of curved stainless steel sheet metal as shown in Fig. 2. Section 20 is curved in three directions, and roughly approximates a portion of the surface of a sphere, while section 21 approximates a portion of a circular cylinder, but the curves of both sections blend smoothly and evenly into the adjacent lining sheets 14 to form a smoothly rounded corner free from sharp corners or crevices.

The corner is preferably assembled in the tank after the adjacent side lining sheets 14 and the bottom sheet 14' have been installed. Curved section 20 is then installed, butting against sheets 14 and overlapping bottom sheet 14', as shown in Fig. 2. Curved section 21 is then set in position, overlapping section 20 and sheets 14 and the parts are welded in place to complete the corner as shown in the figure. Thus, a completely smooth stainless steel interior is formed, with rounded intersections and trihedral corners, which fully satisfies the requirements as to sanitation and prevention of contamination of the contained materials.

It will thus be seen that this invention accomplishes its objects. A rectangular steel tank is provided at relatively low cost with a smooth and corrosion resisting interior surface. Tanks of this description may be economically manufactured by orthodox welding methods, without the necessity of rolling the stainless steel cladding to the base metal plate. When the lining is welded to the tank shell by the method herein disclosed, it is not subjected to severely high temperatures, and thus warpage is held to a minimum and the desirable properties of the lining metal are not seriously disturbed. The lining is securely fastened to and supported by the outer shell, in a smoothly arranged construction free from corner angles or crevices and thus a tank manufactured according to this invention combines the improved corrosion resistance and sanitary properties provided by the smoothly curved, corrosion resistant lining with the mechanical strength, rigidity, and durability of the relatively heavy outer steel shell.

While the invention has been herein disclosed by reference to the details of a preferred embodiment, it is to be understood that such disclosure is intended in an illustrative, rather than a limiting sense, as it is contemplated that various modifications in the details and order of such steps will readily occur to those skilled in the art, within the spirit of the invention and the scope of the appended claims.

I claim:

1. A lined container comprising an outer shell of relatively heavy metallic plates of substantially planar shape secured together at angular intersections therebetween and a lining of thin corrosion resistant sheets laid against the inner surfaces of said outer shell between said intersections, said sheets being curved over and spaced from the angular intersections between adjacent walls of said outer shell and welded to said outer shell intermediate said intersections, adjacent ones of said sheets being joined at adjacent edges by welding to form a continuous, fluid tight lining in said container with smooth planar walls and rounded intersections therebetween.

2. A lined container comprising an outer shell of relatively heavy metallic plates of substantially planar shape pierced with a multiplicity of openings of sufficient diameter to afford access to the walls of said openings, and a lining of thin corrosion resistant sheets laid against the inner surfaces of said outer shell with adjacent edges of adjacent sheets in overlapping relation with each other, said sheets being curved over the angular intersections between adjacent walls of said outer shell and fastened to said outer shell by fillet welds along the line of junction of said sheets and the walls of said openings, adjacent ones of said sheets being joined by welding to form a continuous, fluid tight lining in said container.

3. A lined container of substantially rectangular shape comprising an outer shell comprising relatively heavy metallic plates of substantially planar shape welded together at the intersections thereof and containing a multiplicity of openings of sufficient diameter to afford access to the walls of said openings, and an inner lining comprising relatively thin sheets of corrosion resisting metal in contact with said outer shell with adjacent edges of adjacent sheets in overlapping relation with each other, with one pair of said overlapping edges curved at the angular intersections between adjacent walls of said outer shell to provide a smoothly curved lining over said intersections, said lining being fastened to said outer shell by fillet welds along the junction of said sheets and the walls of said openings and said overlapping edges being joined by fillet welds to form a continuous corrosion resistant fluid type lining in said container.

4. A lined container comprising an outer shell of relatively heavy metallic plates of substantially planar shape, and a lining of thin corrosion resisting sheets laid against the inner surfaces of said shell, said sheets having a simple curvature at the lines of intersections between adjacent walls of said outer shell and a compound curvature at the trihedral corners of said outer shell, said sheets being fastened to said outer shell, and adjacent sheets being joined by welding to form a continuous, smoothly curved, fluid tight lining in said container.

5. A lined container comprising an outer shell comprising relatively heavy metallic plates of substantially planar shape welded together at the intersections thereof and containing a multiplicity of openings of sufficient diameter to afford access to the walls of said openings, an inner lining comprising relatively thin sheets of corrosion resisting material in contact with said outer shell, said sheets having a simple curvature at the lines of intersection between adjacent walls of said outer shell and a compound curvature at the trihedral corners of said shell, with adjacent edges of adjacent sheets in overlapping relation, said sheets being fastened to said outer shell by fillet welds along the junction of said sheets and the walls of said openings and the overlapping edges of adjacent sheets being joined by fillet welds to form a continuous, smoothly curved fluid tight lining in said container.

References Cited in the file of this patent

UNITED STATES PATENTS

| | | |
|---|---|---|
| 175,734 | Nichols | Apr. 4, 1876 |
| 1,043,048 | Grochan | Oct. 29, 1912 |
| 1,803,407 | Rohlfing | May 5, 1931 |
| 1,864,606 | McBride | June 28, 1932 |
| 2,326,137 | Gettelman | Aug. 10, 1943 |
| 2,084,298 | Secrist | June 15, 1937 |
| 2,164,074 | Moses et al. | June 27, 1939 |
| 2,326,137 | Gettelman | Aug. 10, 1943 |
| 2,346,423 | Gray | Apr. 11, 1944 |